United States Patent
Brenot et al.

[15] 3,702,562
[45] Nov. 14, 1972

[54] FLUID STREAM DIRECTION INDICATOR

[72] Inventors: Claude Brenot; Gaston Mollard, both of Paris, France

[73] Assignee: Thomson-CSF

[22] Filed: Sept. 14, 1971

[21] Appl. No.: 180,285

[30] Foreign Application Priority Data

Sept. 23, 1970 France......................7034416

[52] U.S. Cl. .....................................73/1 E, 73/180
[51] Int. Cl. ..............................................G01c 25/00
[58] Field of Search ................73/1 D, 1 E, 180, 188

[56] References Cited

UNITED STATES PATENTS 2,834,208    5/1958    Westman......................73/188
2,995,930    8/1961    Bucalo..........................73/188
3,295,355    1/1967    Fisher..........................73/1 D
3,483,729    12/1969   Sharpe.........................73/1 D

*Primary Examiner*—S. Clement Swisher
*Attorney*—Edwin E. Greigg

[57] ABSTRACT

A pneumatic probe assembly comprises an elongated probe which rotates, under infuence of pneumatic forces impressed on spaced areas of its surface, to a position of equilibrium. The angular position of the probe relative to the body of the instrument represents the measured angle of the fluid stream ; the assembly further comprises a plug-in heating arrangement, leaf-spring type electrical coupling, and a test motor for rotating the probe in the absence of fluid stream, thereby checking the angular indication supplied.

6 Claims, 10 Drawing Figures

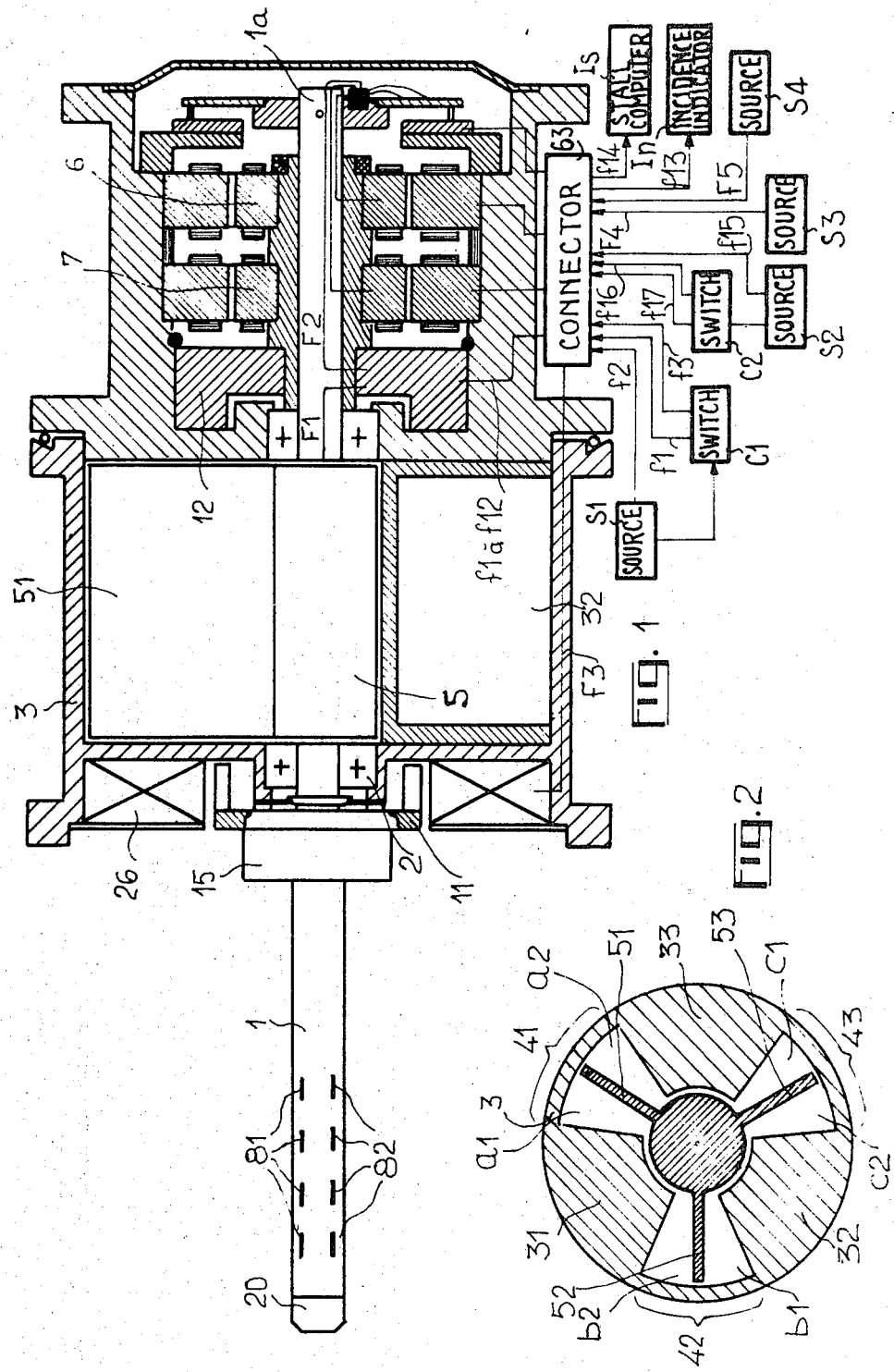

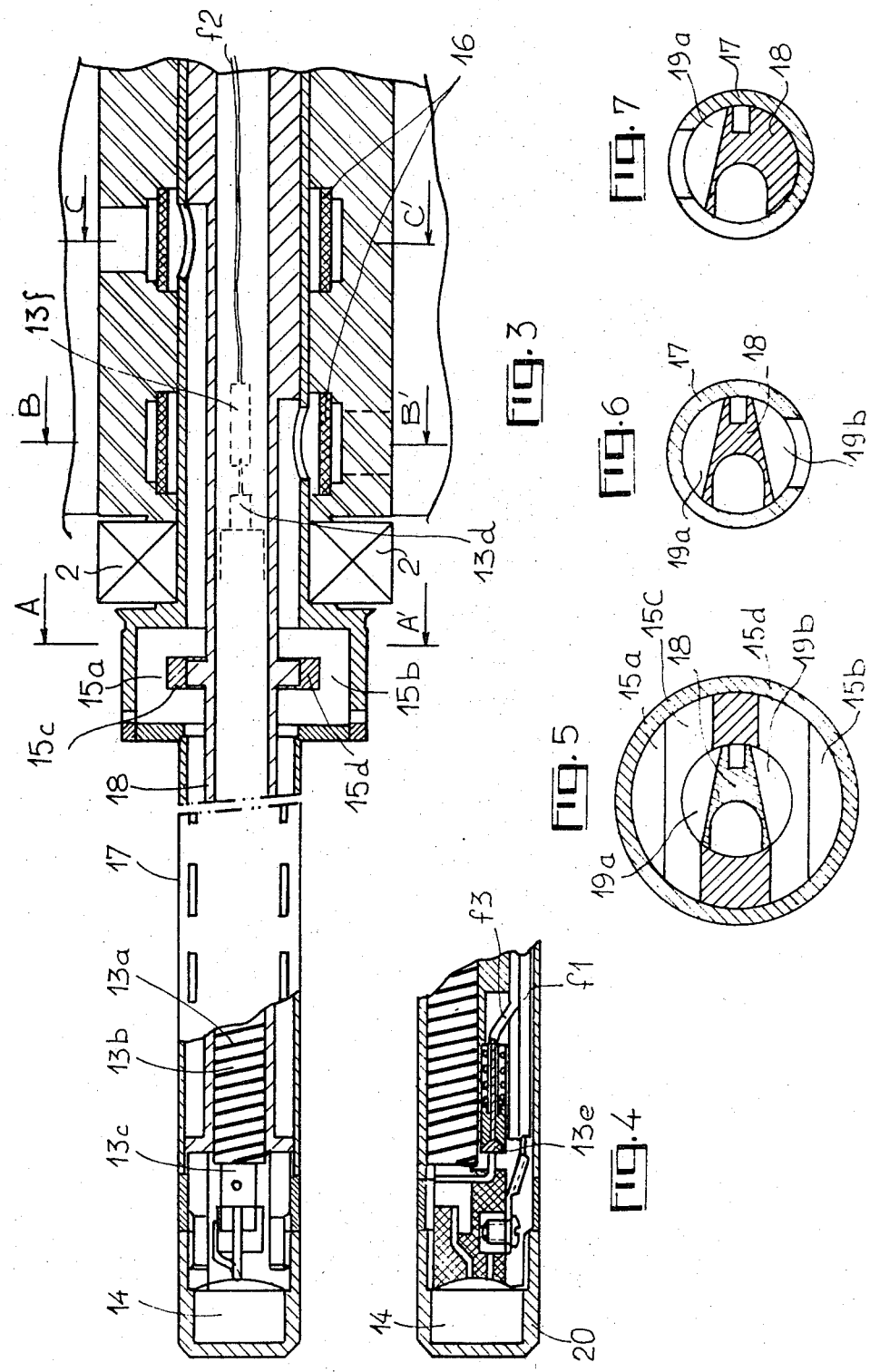

FLUID STREAM DIRECTION INDICATOR

This invention relates to probe assemblies for determining the direction of displacement of a fluid. The invention has been developed more particularly to provide an improved instrument for indicating the angle of incidence of an aircraft and, for convenience of disclosure of the invention, this instrument will be referred to in the following as an "incidence detector," but it is to be understood that it could be used as well for determining the yaw angle of a vehicle if it is appropriately mounted thereon, and, more generally, to determine the direction of relative displacement of any fluid.

The principle of operation of incidence detectors in accordance with the invention is well known : an elongated probe, movable about its own axis, is placed in the stream ; it comprises two, or two rows of air pressure tappings; these tappings communicate through internal ducts with the chambers of a pneumatic motor arranged in the body of the instrument, the moving part of which motor is fixed to the probe, which results in the orientation of the latter in the direction in which the pressures picked up by the tappings are equal.

Detectors operating on this principle have been known for a long time now ; however, their suitability for use in modern aircraft is questionable, both because of the aerodynamic characteristics of these aircraft and of the flying requirements associated therewith.

The present invention relates to an improved detector which is more reliable in operation, better damped, more accurate (this through a wider measurement range) and permits direct transmission of the incidence data to the numerous on-board instruments which are nowadays essential.

According to the invention there is provided an assembly for detecting the direction of displacement of a fluid, comprising a tubular probe, which is movable about its own axis and is provided with two rows of n (a whole number) identical pressure tappings, a pneumatic motor comprising a rotor integral with the probe and a fixed housing in which at least one vane, integral with the rotor, can move, delimiting in said housing at last one pair of chambers of variable volume, the two chambers of a pair communicating respectively with the two rows of pressure tappings ; and means supplying at least one electrical data related to the angular position of the probe about its axis, said assembly further comprising a test motor which enables the checking of the operation of the detector assembly in the absence of any moving fluid, said test motor comprising : a rotor integral with the probe and comprising $p$ magnetic poles ($p$ being a whole number) ; a stator integral with said housing and concentric to the rotor, said stator comprising $kp$ coils ($k$ is a whole number at least equal to 2), associated in groups of $p$, thus creating as many electromagnetic poles when they are energized ; and means for selectively supplying $r$ of the $p$ groups of coils, with electrical energy, where $r$ is a whole number which can have any value between 1 and $k$.

For a better understanding of the invention and to show how the same may be carried into effect, reference will be made to the drawings accompanying the ensuing description and in which :

FIG. 1 is an undetailed and partially sectional view of an incidence detector in accordance with the invention ;

FIG. 2 is a transverse sectional view through the pneumatic motor of the detector;

FIGS. 3 to 7 are sectional views of the detector proper ;

Figure 8:
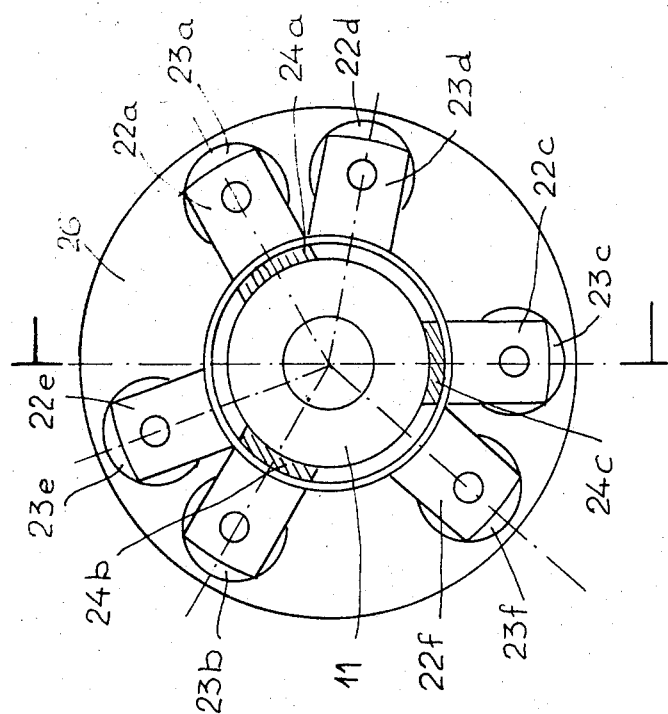
FIGS. 8 and 9 illustrate the test motor incorporated into the detector in accordance with the invention.

The incidence detector, shown in FIG. 1, essentially comprises a tubular probe 1, closed at the front, and provided with two rows of pressure tappings, 81 and 82. The tube can rotate about its own axis inside the fixed housing 3 ; to this end, ball bearings 2 are provided. The tube is fixed to the rotor 5 of a pneumatic motor, the fixed part of which is constituted by the housing 3 itself. FIG. 2 illustrates a schematic section through this motor in a plane perpendicular to the axis. Three partitions 31, 32, 33, integral with the housing, divide the latter's interior in three identical chambers 41, 42, 43 ; the rotor is integral with three vanes 51, 52, 53 which respectively move within said chambers ; the two portions of each chamber, namely $a_1$, $a_2$, $b_1$, $b_2$ and $c_1$, $c_2$, which are separated from one another by the associated vane, communicate respectively with the pressure tappings 81 and 82. The probe automatically positions itself so that the pressures prevailing in the subsidiary compartments $a_1$, $b_1$, $c_1$ on the one hand and $a_2$, $b_2$, $c_2$, on the other hand, are equal.

A small clearance is contrived between the vanes and the housing 3 in order to reduce losses between the two parts of each chamber whilst avoiding friction effects, which would impair the sensitivity of the detector. The tube 1 is extended to the rear of the rotor at $1_a$, in order to drive position detectors (synchros, resolvers, potentiometers and possibly rotary contacts), illustrated schematically at 10. The synchros used will preferably be of the flat type, assembled directly on the extension $1_a$ in order to avoid the need for any mechanical drive . At the front of the pneumatic motor, the tube 1 is fixed to a test motor comprising a rotor 11 and a stator 26. The various electrical supplies and data are transmitted between the moving elements and the fixed housing through a pick-up system or collector illustrated schematically at 12. A chamber for precipitating the atmospheric moisture picked up through the pressure tappings is shown at 15 ; a de-icing resistor with a thermostat, not visible in FIG. 1 where the tube 1 is not sectioned, is arranged inside the forward part of the tube ; the screwed plug 20 is provided to enable easy replacement of the resistor and thermostat assembly. The details of the tube 1, the resistor and the precipitating chamber, are visible in FIGS. 3, 4, 5, 6 and 7 which are respective larger scale fragmentary sectional views in two mutually perpendicular planes of symmetry passing through the axis (FIGS. 3 and 4), and in the planes A A', B B' and C C' (FIGS. 5, 6 and 7).

The de-icing resistors are constituted by a flat wire $13_a$, for example of nickel-iron alloy, spiral-wound round the bottom of a thread formed in an insulating support $13_b$ ; at its ends, the wire is brazed to respective end pieces (only one, $13_c$ is shown) which are integral with respective plug-in elements (only one, $13_e$ is shown) ; the resistor is connected to a d.c. or a.c. source $S_1$ across the thermostat represented systematically at 14 ; the references $f_1$, $f_2$ and $f_3$ indicate the leads for connection to the source $S_1$, the wire $f_3$ being used for testing the resistor. The resistor-thermostat assembly can be dismantled by removing the plug 20; in a known manner the switch device $C_1$ which selectively couples lead $f_1$ or lead $f_3$ to the source, enables the resistor to be tested for proper operation, whether the thermostat is open or closed. The tube 1 comprises a hollow sheath 17 in which a liner 18 defines the passages $19_a$ and $19_b$ of FIGS. 5, 6 and 7, through which the pressure tappings communicate with the chambers of the pneumatic motor.

The pressure tappings, arranged in the tube, are narrow so that the surface tension opposes the entry of water into the passages; however, water may appear as a consequence of condensation in the inoperative condition, when the de-icing system is not operating; in order to eliminate this water the tube is enlarged at the level of the test motor. This enlarged portion contains two independent cavities $15_a$ and $15_b$ (one in the path of each passage). At the center of each cavity there is a baffle plate ($15_c$ and $15_d$) and holes though which the water can be discharged to the exterior.

Figure 9:
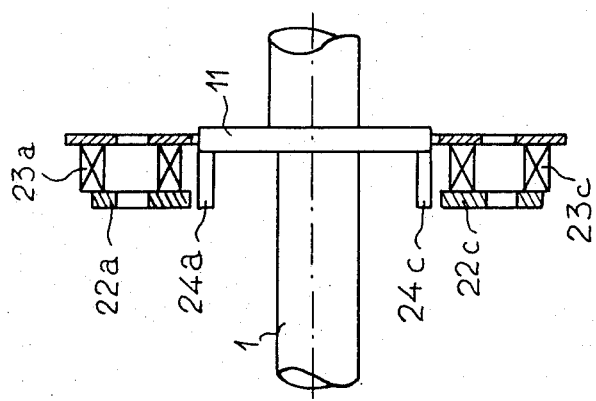

Conventional filters 16 are located upstream of the chambers of the pneumatic motor. Schematic sectional views of the test motor are shown in FIGS. 8 and 9, the sections being made respectively in a plane perpendicular to the axis of the detector and in a plane passing through said axis; this motor enables the probe to be angularly positioned when the aircraft to which it is fitted is at rest on the ground and, consequently, the detector to be checked. It essentially comprises a rotor 11 with three magnetic poles $24_a$, $24_b$ and $24_c$, and a stator 26 with six polepieces $22_a$, $22_b$, $22_c$ and $22_d$, $22_e$, $22_f$, cooperating with one another in pairs, plus six coils $23_a$ to $23_f$ respectively associated with these; depending upon whether it is exclusively the three coils $23_a$, $23_b$ and $23_c$, or the three others, which are supplied, or all the six coils, the rotor will position itself so that poles are respectively opposite the first three polepieces, or opposite the three others, or between the pairs of polepieces $22_a$–$22_d$, $22_b$–$22_e$, and $22_c$–$22_f$; thus, the detector can be checked for general mechanical operation and for accuracy of the electrical data which it supplies, in three distinct positions of the detector element. At $S_2$ a d.c. source has been schematically illustrated and at $C_2$ a three-way switch of known kind for switching the coils, the common supply lead being marked 15 in FIG. 1 and the respective leads of the two groups being marked $f16$ and $f17$; the switch $C_2$ makes it possible to connect to the source $S_2$ either the lead $f16$ or the lead $f17$, or both these leads in parallel.

The various electrical data gathered by the moving parts of the detector will advantageously be picked up without introducing any parasitic couple, this by employing the principle described in the copending Patent Application filed by the present applicants on Sept. 1970 for "Electrical coupling, between elements in relative motion in respect of each other"; the supply to the rotors of the synchros and the potentiometer sliding contacts, would be effected in a similar manner, and in particular the connection of three wires $f_1, f_2, f_3$ for the resistor-thermostat assembly;

the connection of four wires $f_4, f_5, f_6, f_7$ grouped at $F_4$, in order to supply the rotors of the two synchros 6 and 7, the latter being coupled for example to an incidence indicating instrument In and to a stall computer Is;

the connection of two wires $f_8, f_9$ for the supply of two potentiometers 8 and 9 whose sliding contacts are fixed to the shaft of the detector element. $S_3$ and $S_4$ symbolically illustrate the supply sources for the synchros and the potentiometers, respectively, including the possible switches; for the sake of clarity, the supply source of the test motor is not shown. Self-evidently a single source could be substituted for all these sources.

A 12-connection pick up or coupling system is provided, three of the connections, $f_{10}, f_{11}, f_{12}$ making it possible for example to increase the currents drawn by certain elements, such as the heating resistor, by connection in parallel with $f_1, f_2$. These connections can also be used for the coupling to additionnal survey instruments.

Figure 10:
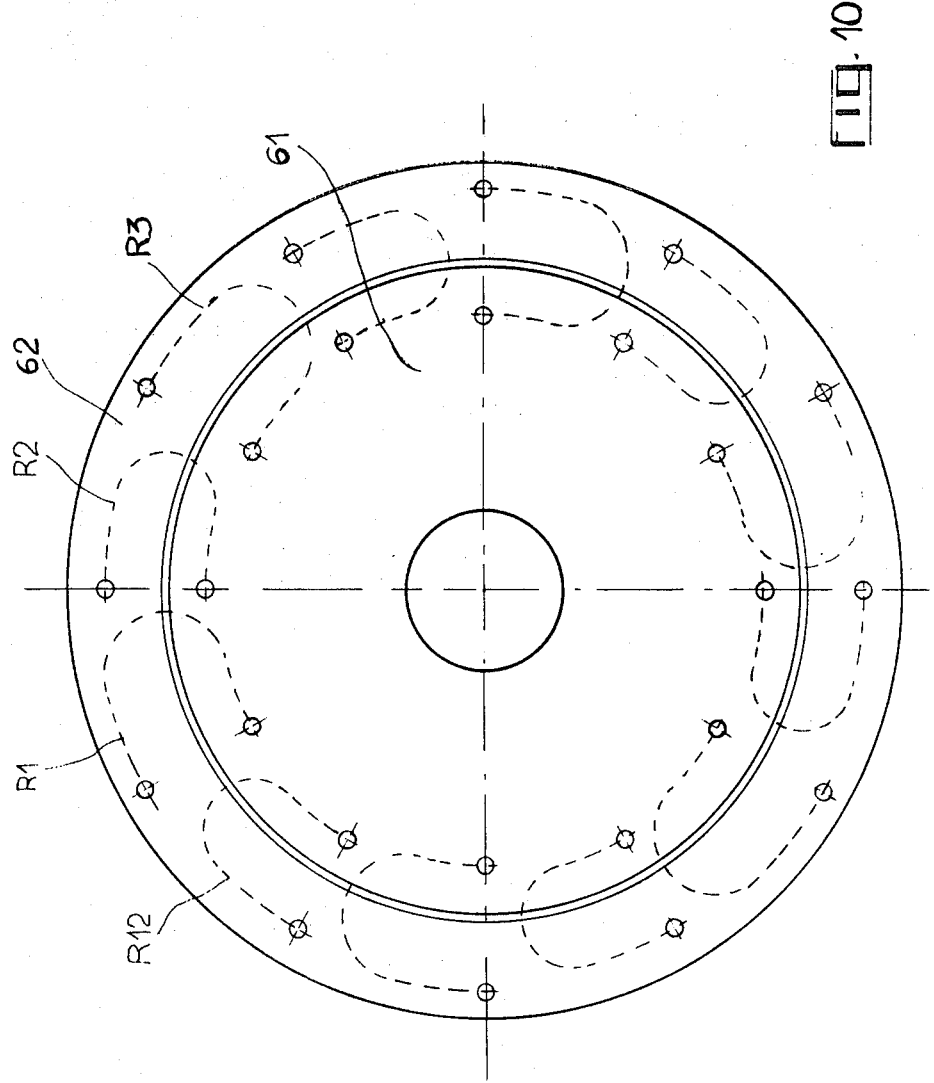
FIG. 10 illustrates an embodiment of the electrical couplings used in the detector in accordance with the invention.

FIG. 10 provides a schematic elevational view of the coupling system: the electrical connections are established by leaf-springs $R_1$ to $R_{12}$ which roll without sliding, in grooves formed on the one hand in the rotor 61 which is integral with the probe, and one the other hand in the stator 62 which is integral with the housing. The springs are arranged in two axially staggered groups as described in the aforementioned Patent Application; their points of attachment to the stator are coupled to the collector 63 which likewise comprises the terminals of the output wires $f_{13}$ and $f_{14}$ from the synchros and these of the wires $f_{15}$ to $f_{17}$ which supply the test motor.

In order not to overburden the Figures, a single line has been used to represent the assembly of leads where these are arranged side by side within the detector namely: $F_1$ for $f_1, f_2, f_3$; $F_2$ for $f_4$ to $f_9$ and $F_3$ for $f_{15}$ to $f_{17}$; the references $F_4$ and $F_5$ respectively cover the leads $f_4$ to $f_7$ between the source $S_6$ and the collector, and $F_8$ and $F_9$ those between the source $S_4$ and the collector.

Similarly, for the sake of clarity, the same references have been used for the leads both inside and outside the incidence detector, even where these leads are not continuous, i.e. where they incorporate the spring strips $R_i$ ($i = 1$ to 12) of the collector 12.

Of course, the invention is not limited to the embodiments described and illustrated here purely by way of example. In particular, the number of poles on the stator of the test motor and the number of rotor poles, associated with one stator pole, may differ, the essential thing being that there should be at least two stator poles per rotor pole; the number of vanes on the pneumatic motor can be reduced or increased depending upon whether the angular measurement range of the detector is to be increased or reduced, it being understood of course that it is desirable to use the maximum possible number of vanes which is compatible with the particular application considered.

The number of elements (potentiometers, synchros) for reproducing the angular position of the detector element, as well as their type, may vary widely in particular in accordance with the application envisaged; although not described here, detection of the position of the probe can be effected by any other appropriate means, for example by optical-electronic means.

Lastly, the dimensions of said elements depend essentially, where the probe itself is concerned, upon the velocity of the fluid in which it is to operate and upon the incidence angles to be measured, and where the overall device is concerned, upon the available space.

What is claimed, is :

1. An assembly for detecting the direction of displacement of a fluid, comprising a tubular probe, which is movable about its own axis and is provided with two rows of $n$ identical pressure tappings, $n$ being a whole number a pneumatic motor comprising a rotor integral with the probe and a fixed housing in which at least one vane, integral with the rotor, can move delimiting in said housing at last one pair of chambers of variable volume, the two chambers of a pair communicating respectively with the two rows of pressure tappings ; and means for supplying at least one electrical data related to the angular position of the probe about its axis, said assembly further comprising a test motor which enables the checking of the operation of the detector assembly in the absence of any moving fluid, said test motor comprising :

a rotor integral with the probe and comprising $p$ magnetic poles, $p$ being a whole number ;

a stator integral with said housing and concentric to the rotor, said stator comprising $kp$ coils where k is a whole number at least equal to 2, associated in groups of $p$, thus creating as many electromagnetic poles when they are energized ; and means for selectively supplying $r$ of the $p$ groups of coils, with electrical energy, where $r$ is a whole number which can have any value between 1 and $k$.

2. A detector assembly according to claim 1 wherein the rotor and the probe are concentric , and wherein $p = 3$ and $k = 2$.

3. A detector assembly according to claim 1 further comprising a plug-in unit comprising a de-icing resistor and a thermostat, the forward end of said probe comprising a detachable plug for the installation or removal of said unit, said resistor being built up of a threaded isolated support and a flat electrical wire threaded thereon.

4. An assembly according to claim 1 further comprising leafsprings which are attached at their ends on the one hand to the body of the assembly and on the other to the moving parts thereof, and are arranged to roll without sliding, respectively in fixed and moving parts of the assembly, these springs being stressed within th their elastic limit, said leafspring ensuring the electrical coupling between the fixed and the movable parts of the assembly.

5. A detector assembly according to claim 1 comprising synchrodetectors and potentiometers wherein the probe comprises an extension wherein integral with the rotors of said synchros, and with the sliding contacts of said potentiometers.

6. A detector assembly according to claim 1 designed to measure angles of incidence of less than 120°, wherein the rotor of said pneumatic motor comprises three vanes ; and wherein the housing of the latter comprises three chambers respectively associated with said three vanes, each vane delimiting, within its associated chamber, two chambers of variable volume which respectively communicate with the two sets of tappings.

* * * * *